United States Patent [19]

Derouane et al.

[11] Patent Number: 4,673,559

[45] Date of Patent: Jun. 16, 1987

[54] SILICOALUMINOPHOSPHATE CRYSTALLIZATION USING HYDROLYSIS

[75] Inventors: Eric G. Derouane, Namur, Belgium; Roland von Ballmoos, Pennington, N.J.

[73] Assignee: Mobil Oil Corporation, New York, N.Y.

[21] Appl. No.: 685,171

[22] Filed: Dec. 21, 1984

Related U.S. Application Data

[63] Continuation-in-part of Ser. No. 562,673, Dec. 19, 1983, abandoned.

[51] Int. Cl.⁴ .............................................. C01B 33/28
[52] U.S. Cl. .................................... 423/306; 423/328; 423/329; 502/214
[58] Field of Search ............... 423/305, 306, 326, 328, 423/329; 502/150, 162, 164, 208, 214, 232

[56] References Cited

U.S. PATENT DOCUMENTS

| | | | |
|---|---|---|---|
| 2,428,741 | 10/1947 | Plank | 502/203 |
| 2,876,266 | 4/1959 | Wegner et al. | 260/641 |
| 3,560,370 | 2/1971 | Billon et al. | 208/111 |
| 3,697,550 | 10/1972 | Bayne et al. | 260/346.8 |
| 3,801,704 | 4/1974 | Kobayashi et al. | 423/309 |
| 3,904,550 | 9/1975 | Pine | 252/437 |
| 4,014,945 | 3/1977 | Zimmerschied | 260/635 |
| 4,071,471 | 1/1978 | Banks et al. | 252/437 |
| 4,158,621 | 6/1979 | Swift et al. | 208/114 |
| 4,179,358 | 12/1979 | Swift et al. | 208/114 |
| 4,205,053 | 5/1980 | Rollmann et al. | 423/328 |
| 4,210,560 | 7/1980 | Kehl | 252/437 |
| 4,222,896 | 9/1980 | Swift et al. | 252/437 |
| 4,228,036 | 10/1980 | Swift et al. | 252/437 |
| 4,310,440 | 1/1982 | Wilson et al. | 252/435 |
| 4,361,705 | 11/1982 | Marcelin et al. | 568/462 |
| 4,363,748 | 12/1982 | Crum et al. | 252/437 |
| 4,365,095 | 12/1982 | Marcelin et al. | 568/462 |
| 4,385,994 | 5/1983 | Wilson et al. | 210/689 |
| 4,440,871 | 4/1984 | Lok et al. | 502/214 |
| 4,495,166 | 1/1985 | Calvert et al. | 423/329 |
| 4,526,879 | 7/1985 | Dwyer et al. | 423/329 X |

FOREIGN PATENT DOCUMENTS

| | | | |
|---|---|---|---|
| 0146922 | 8/1984 | Japan | 423/328 C |
| 1018264 | 1/1966 | United Kingdom | 423/328 C |
| 2068253 | 1/1981 | United Kingdom . | |
| 0286985 | 11/1970 | U.S.S.R. | 502/233 |

*Primary Examiner*—John Doll
*Assistant Examiner*—Lance Johnson
*Attorney, Agent, or Firm*—Alexander J. McKillop; Michael G. Gilman; Dennis P. Santini

[57] ABSTRACT

Silicophosphoaluminates are crystallized from a two-phase reaction mixture comprising sources of silicon oxide, aluminum oxide and phosphorus oxide and a suitable directing agent. The silicophosphoaluminates produced have ion exchange properties and are readily convertible to catalytically active material.

15 Claims, No Drawings

SILICOALUMINOPHOSPHATE CRYSTALLIZATION USING HYDROLYSIS

CROSS-REFERENCE TO RELATED APPLICATION

This is a continuation-in-part of application Ser. No. 562,673, filed Dec. 19, 1983, abandoned.

BACKGROUND OF THE INVENTION

1. Field of the Invention

Synthetic crystalline silicophosphoaluminate can be synthesized in a novel way from a reaction medium consisting of two liquid phases and comprising an organic or inorganic directing agent and specific reactants. This synthesis results in a silicophosphoaluminate crystalline framework having ion-exchange properties and being readily convertible to catalytically active material.

2. Description of Prior Art

Aluminum phosphates are taught in U.S. Pat. Nos. 4,310,440 and 4,385,994, for example. Aluminum phosphate materials have electroneutral lattices and, therefore, are not useful as ion-exchangers or as catalyst coxponents. Microporous aluminum phosphates have a composition typified as:

$$xR:Al_2O_3: (1.0\pm0.2) P_2O_5:yH_2O$$

wherein R is an organic amine or quaternary ammonium salt entrapped within the aluminum phosphate and playing a role as crystallization template, x and y representing the amounts of R and $H_2O$ needed to fill the microporous voids. Because of the aluminum/phosphorus atomic ratio of these materials being about unity, they display virtually no ion-exchange properties, the framework positive charge on phosphorus being balanced by corresponding negative charge on aluminum:

$$AlPO_4=(AlO_2^-)(PO_2^+)$$

The phosphorus-substituted zeolites of Canadian Pat. Nos. 911,416; 911,417 and 911,418 are referred to as "aluminosilicophosphate" zeolites. Some of the phosphorus therein appears to be occluded, not structural. These latter materials containing silicon, aluminum and phosphorus are characterized by the general formula:

$$M_{(x-y)}:x(AlO_2^-):(SiO_2):y(PO_2^+):zH_2O$$

wherein M a monovalent cation, x is approximate 1-, y is 0.05-1.0 and z is the number of hydration water molecules. Structural replacement of silicon with phosphorus has been realized in materials called silica clathrates (West Germany Pat. No. 3,128,988).

U.S. Pat. No. 4,363,748 describes a combination of silica and aluminum-calcium-cerium phosphate as a low acid activity catalyst for oxidative dehydrogenation. Great Britain Pat. No. 2,068,253 discloses a combination of silica and aluminum-calcium-tungsten phosphate as a low acid activity catalyst for oxidative dehydrogenation. U.S. Pat. No. 3,801,704 teaches an aluminum phosphate treated in a certain way to impart acidity. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other teachings of aluminum phosphates and their preparation include U.S. Pat. Nos. 4,365,095; 4,361,705; 4,222,896; 4,210,560; 4,179,358; 4,158,621; 4,071,471; 4,014,945; 3,904,550 and 3,697,550. Since their neutral framework structure is void of ion-exchange properties, they are used as catalyst supports or matrices. The crystalline silicophosphoaluminates synthesized hereby are molecular sieve or other framework structures exhibiting ion-exchange properties and are easily and conveniently converted to materials having intrinsic catalytic activity. Techniques for synthesis of zeolites or aluminum phosphates taught in the art are not particularly useful for synthesis of these crystalline silicophosphoaluminates.

U.S. Pat. No. 4,440,871 teaches a method for synthesizing silicoaluminophosphates in the same fashion as aluminum phosphates.

SUMMARY OF THE INVENTION

A method is provided for synthesis of crystalline silicophosphoaluminates, some of which have microporosity and catalytic activity, all of which exhibit ion-exchange properties and the ready ability for conversion to material having catalytic activity. The synthesis method for preparing such silicophosphoaluminate materials comprises the steps of (1) preparing a two-phase reaction mixture containing particular components and comprising both a liquid organic phase at a liquid aqueous phase; (2) heating the reaction mixture at a rate of from 5° C. to 200° C. per hour to a temperature of from 80° C. to 300° C.; (3) agitating the reaction mixture in a manner sufficient to intimately admix said liquid organic and aqueous phases with each other; (4) maintaining the agitated reaction mixture at a temperature of from 80° C. to 300° C. and a pH of from 2 to 9 until crystals of silicophosphoaluminate material are formed; and (5) recovering silicophosphoaluminate material from the reaction mixture.

The essential components of the two-phase reaction mixture include water, sources of aluminum oxide, silicon oxide, phosphorus oxide, an organic directing agent A, inorganic cations M and anions N; and a substantially water-immiscible organic solvent. Such components are present in the following relationships:

$$(A)_a:(M_2O)_b:(Al_2O_3)_c:(SiO_2)_d:(P_2O_5)_e:(Solvent)_f:(\text{anion source})_g:(H_2O)_h$$

wherein a, b, c, d, e, f, g and h are numbers satisfying the following relationships:
a/(c+d+e) is less than 4,
b/(c+d+e) is less than 2
d/(c+e) is less than 2,
f/(c+d+e) is from 0.1 to 15,
g/(c+d+e) is less than 2, and
h/(c+d+e) is from 3 to 150.

Upon initial preparation of the reaction mixture, the source of one of the aluminum, silicon or phosphorus oxides is dispersed or dissolved in the organic phase.

The silicophosphoaluminate produced by this method is characterized by a composition in which the number of atoms of aluminum and phosphorus is greater than the number of atoms of silicon, i.e. Al+P>Si. It is named "silicophosphoaluminate" in view of its crystalline composition and of the charge distribution on its framework tetrahedral T-sites. As synthesized, the characteristic composition for such silicophosphoaluminate, in the anhydrous state, is as follows:

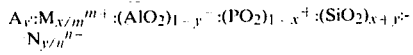

wherein v is moles of A+ which is the occluded organic material resulting from organic directing agent A and/or organic solvent used in synthesis of and filling microporous voids of the silicophosphoaluminate, which material may be removed upon calcination; M is an inorganic cation of valence m; N is an anion of valence n; and x and y are numbers of from greater than −1 to less than +1 which satisfy the relationships:
 (1) if x is 0, the y is not 0,
 (2) if y is 0, then x is not 0,
 (3) if the atomic ratio of Al/P is greater than 1, then (x+y) is greater than 0, e.g. 0.001, and y+0.6x is less than 0.4, and
 (4) if the atomic ratio of Al/P is less than 1, then (x+y) is greater than 0, e.g. 0.001, and 0.5 is greater than 0.5y+x.

In the above composition, when x is greater than y, the silicophosphoaluminate is a cation exchanger with potential use as an acidic catalyst. When x is less than y, the silicophosphoaluminate is an anion exchanger with potential use as a basic catalyst. In any event, the silicophosphoaluminate will exhibit an ion exchange capacity of at least about 0.002 meq/g.

The composition of the silicophophoaluminate in the anhydrous state with organic material removed, and with M, m, N, n, x and y as above-defined, is as follows:

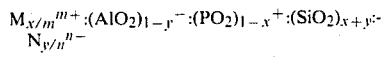

EMBODIMENTS

The disclosure of U.S. patent application Ser. No. 562,673 is incorporated herein by reference.

The synthetic crystalline silicophosphoaluminates prepared by the present method are effective cationic ion-exchangers and acid catalysts when the Al/P ratio is greater than unity. Such catalysts have an acid strength spectrum differing from that of zeolites, which can be beneficial in some catalytic processes. For Al/P ratios lower than unity, anionic exchange properties prevail and render such materials active for base-catalyzed reactions. They also offer a new class of catalyst supports and are particularly interesting in this respect because of their high ion-exchange capacity which should enable the retention of rather high metal loadings. They will show in the latter case the same catalytic flexibility as other supported metal catalysts. Sorption properties indicate that microporous silicophosphoaluminates are molecular shape selective and this can be advantageous in numerous catalytic processes as known in the art of zeolite catalysis.

If synthesized with an aluminum/phosphorus atomic ratio of greater than one, the crystalline silicophosphoaluminate will exhibit an aluminum/silicon atomic ratio of greater than 1.5, and usually in the range of from 1.6 to 600. When the aluminum/phosphorus ratio is of less than one, it exhibits a phosphorus/silicon atomic ratio of greater than unity, usually within the range of from 1.2 to 600.

It is well recognized that aluminum phosphates exhibit a phosphorus/aluminum atomic ratio of about unity, and no silicon.

Also, the phosphorus-substituted zeolite compositions, sometimes referred to as "aluminosilicophosphate" zeolites, have a silicon/aluminum atomic ratio of usually greater than unity, generally from 0.66 to 8.0, and a phosphorus/aluminum atomic ratio of less than unity, usually from greater than 0 to 1.

The use of a two-phase synthesis reaction mixture system, exclusive of the solids, enables one to maintain in solution in the organic phase one or more of the reactants which are normally insoluble or unstable in the aqueous phase under the present synthesis conditions. Such a procedure enables the preparation of silicophosphoaluminates, the synthesis of which may be unsuccessful using other techniques. The two-phase synthesis method of the present invention also enhances the ability to control the crystallization reaction. Further, microporous properties can be achieved for the crystalline silicophosphoaluminates by performing inorganic syntheses in the presence of organic or inorganic directing agents. In addition to its templating role, the organic directing agent can also act as a surfactant. It can help the codispersion of the organic and aqueous phases containing the reagents.

In the synthesis method of the present invention, the reaction mixture will contain, as noted hereinbefore, sources of silicon oxide, phosphorus oxide and aluminum oxide, directing agent(s) and an organic solvent in the relationship hereinbefore set forth.

The organic directing agent may be selected from the group consisting of organic mono-, di- or polyamines and onium compounds having the following formulas:

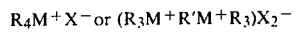

wherein R or R' is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a tetracoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

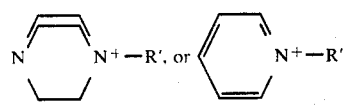

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

Particularly preferred organic directing agents for the present method include alkylamines wherein alkyl is of 1 to 3 carbon atoms and onium compounds, above defined, wherein R is alkyl of 1 to 4 carbon atoms, R' is alkylene of 1 to 6 carbon atoms, M is nitrogen and X is halide or hydroxide. Non-limiting examples of these include di-n-propylamine, tetrapropylammonium hydroxide, tetraethylammonium hydroxide, tetrapropylammonium bromide, and hexamethyl-hexane diammonium hydroxide or bromide. An inorganic hydroxide or salt useful as pH adjustant agents can also serve as a supplemental directing agent. Non-limiting examples of such compounds are KOH, NaOH, CsOH, CsBr, NaCl, Ca(OH)$_2$, and the like.

The useful sources of aluminum oxide include, as non-limiting examples, any known form of aluminum oxide or hydroxide, organic or inorganic salt or compound.

The useful sources of phosphorus oxide include, as non-limiting examples, any known form of phosphorus acids or phosphorus oxides, phosphates and phospites, and organic derivatives of phosphorus.

The useful sources of silicon oxide include, as non-limiting examples, any known form of silicic acid or silicon dioxide, alkoxy or other compounds of silicon.

The organic solvent used to form the two-phase reaction mixture can be any organic liquid which is substantially immiscible with water under the crystallization conditions of the present method. Non-limiting examples of such a solvent include the $C_5$–$C_{10}$ alcohols, phenols, and naphthols; and other water-immiscible organic solvents. Polar organic compounds are preferred for the organic phase solvent.

The inorganic cations and anions essentially present in the reaction mixture are generally not provided by separately added components. Rather, these cations and anions will frequently come from compounds added to the reaction mixture to provide the other essential components such as the silicon, alumina and/or phosphorus sources or such as the directing agent or any pH adjustment agents which may be used.

One of the sources of silicon oxide, aluminium oxide or phosphorus oxide must initially be present in the organic phase of the reaction mixture. The aqueous phase will thus comprise the directing agent, cations and anions, pH adjustment agents and those remaining essential components which are not added to the organic phase.

The reaction mixture having the composition hereinbefore described is heated carefully at a rate of from about 5° C. to about 200° C. per hour up to a temperature of from about 80° C. to about 300° C. and maintained within that temperature range until crystals of desired silicophosphoaluminate form, usually from about 5 hours to about 500 hours. The pH of the reaction mixture during crystallization is carefully maintained at from about 2 to about 9. This may be accomplished by adjusting the concentration of the added base(s).

During the heat-up and crystallization steps, the reaction mixture will generally be agitated in a manner sufficient to intimately admix the substantially immiscible organic and aqueous phases. Techniques for dispersing the organic and aqueous phases in each other are well know in the art. It may even be desirable to form an emulsion of the organic and aqueous phases in order to maximize the interface between these liquid phases.

Following crystallization of the desired silicophosphoaluminate, the reaction mixture containing same is filtered and the recovered crystals are washed, for example with water, and then dried, such as by heating at from about 25° C. to about 150° C. at atmospheric pressure.

In a more specific illustration of the present synthesis method, the aqueous phase contains the phosphorus and aluminum reagents, for example phosphoric acid and alumina. The organic phase with, for example, hexanol as solvent contains the silicon source, e.g. tetraorthoalkylsilicate. The organic directing agent, e.g. tetraalkylammonium hydroxide or an amine, also acts as a surfactant to emulsify the aqueous and organic phases and optimize the interface. Silicon is progressively supplied during synthesis to the gel by hydrolysis of its organic compound and transfer of the product through the interface into the aqueous phase.

As silicon, aluminum and phosphorus must be available simultaneously to nucleate and crystallize silicophosphoaluminate, the rates of supply of all three elements have to be comparable. This implies that the neutralization reaction, e.g. between $H_3PO_4$ and $Al_2O_3$, and the hydrolysis of the organic silicon compound have to be concerted. Therefore, it may be important to predigest the alumina-phosphoric acid mixture. Even more critical will be the silicon supply rate which is depending on factors such as the magnitude of the interface, temperature, pH of the aqueous phase, concentration, and nature of the organic solvent and of the silicon reagent.

Because the hydrolysis and transfer rates of silicon are controlled by the magnitude of the interface, as discussed earlier, silicon incorporation is expected to be favored as mixing increases.

As mentioned hereinbefore, pH is a critical synthesis variable. As the formation of the silicophosphoaluminate proceeds, pH values of around or above neutral (i.e. about 6 or more, up to a maximum of 9) should be maintained. As the base stability of silicophosphoaluminates is expected to be intermediate between those of aluminum phosphates and zeolites, pH values of about or slightly above 8 are preferred. Because of the major role played by the hydrolysis of the silicon reagent and the necessity to control it in the present method, there is a need to have a nearly constant pH during crystallization (in particular, to avoid rapid acid hydrolysis of the silicon source). This can be achieved by predigestion of alumina in phosphoric acid before addition of the other reagents, which raises the initial pH of the synthesis mixture to 5–7.

To achieve and maintain higher pH values (pH=8 or above), even after partial decomposition of the organic hydroxide, inorganic bases may be added. These inorganic bases can also play a role as supplemental directing agents.

The silicophosphoaluminates prepared hereby having silicon, phosphorus and aluminum as crystal lattice framework components may be molecular sieves or other framework structures. When they are molecular sieves or dense materials, they will possess definite distinguishing crystalline structures which exhibit characteristic X-ray powder diffraction patterns. When they are not molecular seives, but instead, for example, layered crystalline structures, they may not be fully characterizable simply from x-ray data. Basal x-ray spacing in expandable layered structures are not fixed and may vary over a wide range. The number of sharp diffraction maxima is usually quite limited and there are often large variations in the intensities of peaks. Since d-spacings of a layered structure change with water content, it is considered appropriate to identify X-ray data of dehydrated samples of such materials, as done in the examples presented hereinafter.

When X-ray values are determined for the silicophosphoaluminates of the present invention, whether molecular sieve or other structures, the radiation is the K-alpha doublet of copper and a diffractometer equipped with a scintillation counter and an associated computer is used. The peak heights, I, and the positions as a function of 2 theta, where theta is the Bragg angle, are determined using algorithms on the computer associated with the spectrometer. From these, the relative intensities, 100 I/$I_o$, where $I_o$ is the intensity of the strongest line or peak, and d (obs.), the interplanar spacing in Angstroms (A), corresponding to the recorded lines, are determined. The relative intensities are given in terms of the strongest line being taken as 100. The various cationic forms of particular silicophosphoaluminates reveal substantially the same pattern with some shifts in interplanar spacing and variation in relative intensity. Other variations can occur, depending on the silicon to aluminum and phosphorus to aluminum ratios of the particular sample, as well as its degree of thermal treatment.

Some silicophosphoaluminates are microporous materials with a framework containing tetrahedrally coordinated (by oxygen) Si, P and Al atoms. They show ion-exchange, acidic, and catalytic properties which resemble those of zeolites. Because of their different acid strength spectrum, however, they are potentially interesting as catalysts for acid-catalyzed conversions in which too high or too low an acidity may result in unwanted secondary reactions. Acidity associated with framework Al is brought in by replacement of phosphorus with silicon. Alternately, basicity associated with framework P occurs when framework aluminum is replaced by silicon. Silicophosphoaluminates prepared by the two-phase synthesis method of the present invention are comparatively homogenous with respect to distribution of silicon atoms throughout the crystal structure.

The silicophosphoaluminates synthesized hereby can also be used as catalyst in intimate combination with a metal component such as silver, tungsten, vanadium, molybdenum, rhenium, chromium, manganese, or a Group VIII metal such as platinum or palladium where, for example, a hydrogenation-dehydrogenation or oxidation function is to be performed. Such a component can be ion-exchanged into the composition, impregnated therein or intimately physically admixed therewith. Such component can be impregnated in or onto it such as for example, by, in the case of platinum, treating the crystal with a solution containing a platinum metal-containing ion. Ihus, suitable platinum compounds include chloroplatinic acid, platinous chloride and various compounds containing the platinum amine complex.

The original ions, i.e. cations or anions, of the as synthesized silicophosphoaluminates can be replaced in accordance with techniques well known in the art, at least in part, by ion exchange with other cations or anions. Preferred replacing cations include metal ions, hydrogen ions, hydrogen precursor, e.g. ammonium, ions and mixtures thereof. Particularly preferred cations include hydrogen, rare earth metals and metals of Groups IIA, IIIA, IVA, IB, IIB, IIIB, IVB, VIB and VIII of the Periodic Table of the Elements.

Typical ion exchange technique would be to contact the synthetic crystalline silicophosphoaluminate with a salt of the desired replacing ion or ions. Examples of such salts of cations include the halides, e.g. chlorides, nitrates and sulfates.

The silicophosphoaluminate prepared in accordance herewith can be beneficially converted to another form by thermal treatment. This thermal treatment is generally performed by heating one of these forms at a temperature of at least 300° C. for at least 1 minute and generally not longer than 20 hours. While subatmospheric pressure can be employed for the thermal treatment, atmospheric pressure is desired for reasons of convenience. The thermal treatment can be performed at a temperature up to about 1000° C. The thermally treated product is particularly useful in the catalysis of certain hydrocarbon conversion reactions. The silicophosphoaluminate prepared in accordance with the present two-phase synthesis method can, in some instances, have greater thermal stability in comparison with similar materials prepared by other methods.

Further, the silicophosphoaluminate, when employed either as an adsorbent, ion-exchanger or as a catalyst in an organic compound conversion process should be dehydrated, at least partially. This can be done by heating to a temperature in the range of 200° C. to 600° C. in air or an inert atmosphere, such as nitrogen, etc. and at atmospheric, subatmospheric or superatmospheric pressures for between 30 minutes and 48 hours. Dehydration can also be performed at room temperature merely by placing the silicophosphoaluminate in a vacuum, but a longer time is required to obtain a sufficient amount of dehydration. Therefore, depending upon the degree of dehydration or thermal treatment desired for the silicophosphoaluminate, it may be subjected to heating at a temperature of from about 200° C. to about 1000° C. for a time of from about 1 minute to about 48 hours.

The crystals of the silicophosphoaluminate prepared by the instant invention can be shaped into a wide variety of particle sizes. Generally speaking, the particles can be in the form of a powder, a granule, or a molded product, such as an extrudate having a particle size sufficient to pass through a 2 mesh (Tyler) screen and be retained on a 400 mesh (Tyler) screen. In cases where the composition is molded, such as by extrusion, the crystals can be extruded before drying or partially dried and then extruded.

In the case of many catalysts, it is desired to incorporate the silicophosphoaluminate with another material resistant to the temperatures and other condition employed in organic conversion processes. Such materials include active and inactive material and synthetic or naturally occurring zeolites as well as inorganic materials such as clays, silica and/or metal oxides. The later may be either naturally occurring or in the form of gelatinous precipitates or gels including mixtures of silica and metal oxides. Use of a material in conjunction with the new silicophosphoaluminate, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without exploying other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin families which include the subbentonites, and the kaolins commonly known as Dixie, McNamee, Georgia and Florida clays or others in which the main mineral contituent is halloysite, kaolinite, dickite, nacrite, or anauxite. Such clays can be used in the raw sate as originally mined or initially subjected to calcination, acid treatment or chemical modification. Binders useful for compositing with the present crystal also include inorganic oxides, notably alumina or silica.

In addition to the foregoing materials, the silicophosphoaluminate crystal can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline silicophosphoaluminate material and inorganic oxide gel matrix vary widely, with the crystal content ranging from about 1 to about 90 percent by weight and more usually, particularly when the composite is prepared in the form of beads, in the range of about 2 to about 80 weight percent of the composite.

The crystalline materials of the present invention are readily convertible to catalytically active material for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 $hr^{-1}$ to about 20 $hr^{-1}$; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In general, therefore, catalytic conversion conditions over a catalyst comprising the silicophosphoaluminate in active form include a temperature of from about 100° C. to about 760° C., a pressure of from about 0.1 atmosphere (bar) to about 200 atmospheres (bar), a weight hourly space velocity of from about 0.08 $hr^{-1}$ to about 2000 $hr^{-1}$ and a hydrogen/organic, e.g. hydrocarbon, compound of from 0 to about 100.

In order to more fully illustrate the nature of the invention and the manner of practicing same, the following exaxples are presented. In the examples, whenever adsorption data are set forth for comparison of sorptive capacities for various adsorbates, they were determined as follows:

A weighed sample of the calcined adsorbant was contacted with a flowing stream of the equilibrium vapor of the adsorbate at 25° C., admixed with dry nitrogen. Adsorbates were water vapor, n-hexane, 2-methylpentane, xylene or cyclohexane vapors. The sample temperature was maintained at 90° C. for adsorbates other than ortho-xylene for which it was 120° C. and water for which it was 60° C. The increase in weight measured gravimetrically was converted to the adsorption capacity of the sample in g/100 g of calcined (550° C. at 20° C./minute in air) adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 $sec^{-1}$). In the case of zeolite HZSM-5, only 174 ppm of tetrahedrally coordinated $Al_2O_3$ are required to provide an Alpha Value of 1. The Alpha Test is described in U.S. Pat. No. 3,3543,078 and in *The Journal of Catalysis*, Vol. IV, pp. 522–529 (August 1965), each incorporated herein by reference as to that description.

When ion-exchange capacity is examined, it is determined by titrating with a solution of sulfamic acid the gaseous ammonia evolved during the temperature programmed decomposition of the ammonium-form of the silicophosphoaluminate. The method is described in *Thermochimica Acta*, Vol. III, pp. 113–124, 1971 by G.

T. Kerr and A. W. Chester, incorporated herein by reference as to that description.

EXAMPLE 1

A two-phase synthesis reaction mixture was prepared with the organic phase comprised of 60 grams 1-hexanol and 10 grams $Si(OC_2H_5)_4$, and the aqueous phase comprised of 13.7 grams $Al_2O_3$, 23.1 grams $H_3PO_4$ (85%), 84 grams of 25% tetrapropylammonium hydroxide (TPAOH) and 30 grams $H_2O$. The reaction mixture as a whole had a composition including 9.3% Si, 38.8% P and 51.9% Al, the percentages atomic. The directing agent was the tetrapropylammonium hydroxide.

The reaction mixture was heated at 50° C. per hour to 150° C. and maintained at that temperature for 65 hours until crystals of silicophosphoaluminate designated herein as MCM-1 were formed. The starting pH was between 5 and 7.

The crystalline product was separated from the reaction mixture by filtration, water washed and then dried at 80° C. The product crystals were analyzed to contain 15.7% Si, 34.8% P and 49.5% Al, percentages atomic. A sample of the as synthesized MCM-1 silicophosphoaluminate was then submitted for X-ray analysis and found to be a crystalline structure exhibiting the diffraction lines shown in Table 1.

TABLE 1

| | (MCM-1) | |
|---|---|---|
| Interplanar d-Spacing (A) | Observed 2 × Theta | Relative Intensity, $I/I_o$ |
| 9.6677 | 9.140 | 29.97 |
| 6.8569 | 12.900 | 100.00 |
| 6.4870 | 13.639 | 77.56 |
| 5.6000 | 15.812 | 5.00 |
| 4.8729 | 18.190 | 51.07 |
| 4.8414 | 18.310 | 50.26 |
| 4.2482 | 20.893 | 85.10 |
| 3.9700 | 22.375 | 5.00 |
| 3.6099 | 24.641 | 9.67 |
| 3.4401 | 25.877 | 6.62 |
| 3.3900 | 26.267 | 41.66 |
| 3.0597 | 29.162 | 77.25 |
| 2.9312 | 30.471 | 15.08 |
| 2.8927 | 30.886 | 16.69 |
| 2.7777 | 32.199 | 10.96 |
| 2.6781 | 33.432 | 41.21 |

EXAMPLE 2

A quantity of the crystalline MCM-1 silicophosphoaluminate of Example 1 was calcined at 450° C. in nitrogen for 4 hours and then X-ray analyzed. The results are presented in Table 2.

TABLE 2

| Interplanar d-Spacing (A) | Observed 2 × Theta | Relative Intensity, $I/I_o$ |
|---|---|---|
| 6.8339 | 12.944 | 94.83 |
| 4.8477 | 18.286 | 11.21 |
| 4.7900 | 18.507 | 10.00 |
| 4.5300 | 19.579 | 8.00 |
| 4.2731 | 20.770 | 100.00 |
| 4.1441 | 21.424 | 43.10 |
| 3.6246 | 24.539 | 9.98 |
| 3.5438 | 25.108 | 1.54 |
| 3.4200 | 26.032 | 10.00 |
| 3.2900 | 27.079 | 5.00 |
| 3.0823 | 28.944 | 11.86 |
| 3.0427 | 29.329 | 13.57 |
| 2.6961 | 33.202 | 2.87 |

EXAMPLE 3

A two-phase synthesis reaction mixture was prepared with the organic phase comprised of 60 grams 1-hexano and 10 grams $Si(OC_2H_5)_4$, and the aqueous phase comprised of 23.1 grams $H_3PO_4$(85%), 10 grams $Al_2O_3$, 84 grams TPACH (25%) and 30 grams $H_2O$. The reaction mixture as a whole had a composition incuding 10.8% Si, 45.0% P and 44.2% Al, the percentages atomic. The directing agent was the tetrapropylammonium hydroxide.

The reaction mixture was heated at 50° C. per hour to 150° C. and maintained at that temperature for 168 hours until crystals of silicophosphoaluminate designated herein as MCM-2 were formed. The starting pH was between 5 and 7.

The crystalline product was separated from the reaction mixture by filtration, water washed and then dried at 80° C. The product crystals were analyzed to contain 17.5% Si, 37.2% P and 45.4% Al, percentages atomic, and to be large in size. A sample of the as synthesized MCM-2 silicophosphoaluminate was then submitted for X-ray analysis and found to be a crystalline molecular sieve of chabazite type exhibiting the diffraction lines shown in Table 3.

TABLE 3

| | (MCM-2) | |
|---|---|---|
| Interplanar d-Spacing (A) | Observed 2 × Theta | Relative Intensity, $I/I_o$ |
| 9.2412 | 9.563 | 99.21 |
| 6.8600 | 12.894 | 24.93 |
| 6.4868 | 13.640 | 7.48 |
| 6.2515 | 14.155 | 14.65 |
| 5.5144 | 16.059 | 72.90 |
| 4.8868 | 18.138 | 21.38 |
| 4.8257 | 18.370 | 11.67 |
| 4.3030 | 20.624 | 100.00 |
| 4.2584 | 20.843 | 23.57 |
| 4.0000 | 22.205 | 5.00 |
| 3.8400 | 23.142 | 5.00 |
| 3.5075 | 25.373 | 21.42 |
| 3.4376 | 25.897 | 22.89 |
| 3.3947 | 26.230 | 7.27 |
| 3.1239 | 28.550 | 1.77 |
| 3.0495 | 29.262 | 14.07 |
| 3.0160 | 29.594 | 5.90 |
| 2.9190 | 30.601 | 33.97 |
| 2.8492 | 31.370 | 25.06 |

EXAMPLE 4

The synthesis of Example 3 was repeated except that the aqueous phase contained 17.0 grams $Al_2O_3$. The resulting product crystalline silicophosphoaluminate was of small crystal size with 13.2% Si, 36.3% P and 50.5% Al, percentages atomic.

EXAMPLE 5

A quantity of the crystalline MCM-2 silicophosphoaluminate of Example 3 was calcined at 450° C. in nitrogen for 4 hours and then X-ray analyzed. The results are presented in Table 4.

TABLE 4

| Interplanar d-Spacing (A) | Observed 2 × Theta | Relative Intensity, $I/I_o$ |
|---|---|---|
| 9.2476 | 9.556 | 100.00 |
| 6.8414 | 12.929 | 23.34 |
| 6.2800 | 14.090 | 2.00 |
| 5.5050 | 16.087 | 16.61 |
| 4.9465 | 17.918 | 5.05 |

TABLE 4-continued

| Interplanar d-Spacing (A) | Observed 2 × Theta | Relative Intensity. I/I₀ |
|---|---|---|
| 4.6200 | 19.194 | 2.00 |
| 4.2923 | 20.676 | 35.99 |
| 3.8415 | 23.134 | 4.72 |
| 3.5423 | 25.119 | 6.97 |
| 3.4266 | 25.982 | 7.73 |
| 3.2100 | 27.768 | 2.00 |
| 3.1600 | 28.216 | 2.00 |
| 2.9086 | 30.174 | 15.30 |
| 2.8621 | 31.226 | 8.93 |

EXAMPLE 6

A two-phase synthesis reaction mixture was prepared with the organic phase comprised of 60 grams 1-hexanol and 10 grams Si(OC$_2$H$_5$)$_4$, and the aqueous phase comprised of 7 grams Al$_2$O$_3$, 23.1 grams H$_3$PO$_4$ (85%), 84 grams TPAOH (25%), and 30 grams H$_2$O. The reaction mixture as a whole had a composition including 12.4% Si, 52.0% P and 35.6% Al, the percentages atomic. The directing agent was tetrapropylammonium hydroxide. The starting pH was between 5 and 7.

The reaction mixture was heated at 50° C. per hour to 150° C. and maintained at that temperature for 65 hours until crystals of silicophosphoaluminate designated herein as MCM-3 were formed. The pH at the start of reaction was between 5 and 7.

The crystalline product was separated from the reaction mixture by filtration, water washed and then dried at 80° C. A sample of the as synthesized MCM-3 silicophosphoaluminate was then submitted for X-ray analysis and found to be a crystalline structure exhibiting the diffraction lines shown in Table 5.

TABLE 5

| Interplanar d-Spacing (A) | (MCM-3) Observed 2 × Theta | Relative Intensity. I/I₀ |
|---|---|---|
| 5.1933 | 17.059 | 43.92 |
| 4.8933 | 18.114 | 15.90 |
| 4.5500 | 19.493 | 1.00 |
| 4.2976 | 20.650 | 100.00 |
| 3.9617 | 22.423 | 23.28 |
| 3.9145 | 22.697 | 63.05 |
| 3.8453 | 23.111 | 14.34 |
| 3.6884 | 24.109 | 28.92 |
| 3.5868 | 24.802 | 49.12 |
| 3.3852 | 26.305 | 4.70 |
| 3.0406 | 29.349 | 20.04 |
| 2.9094 | 30.705 | 12.74 |
| 2.8588 | 31.262 | 14.05 |
| 2.7565 | 32.454 | 12.24 |

EXAMPLE 7

A two phase synthesis reaction mixture was prepared with the organic phase comprised of 60 grams 1-hexanol and 10 grams Si(OC$_2$H$_5$)$_4$, and the aqueous phase comprised of 15.8 grams Al$_2$O$_3$, 42.3 grams H$_3$PO$_4$ (85%), 84 grams TPAOH (25%) and 30 grams water. The reaction mixture as a whole had a composition including 6.6% Si, 50.6% P and 42.8% Al, the percentages atomic. The directing agent was tetrapropylammonium hydroxide. The reaction mixture was heated at 50° C. per hour to 150° C. and maintained at that temperature for 168 hours until crystals of silicophosphoaluminate designated herein as MCM-4 were formed. The starting pH was between 5 and 7.

The crystalline product was separated from the reaction mixture by filtration, water washed and then dried at 80° C. A sample of the as synthesized MCM-4 silicophosphoaluminate was then submitted for X-ray analysis and found to be a crystalline material exhibiting the diffraction lines shown in Table 6.

TABLE 6

| Interplanar d-Spacing (A) | (MCM-4) Observed 2 × Theta | Relative Intensity. I/I₀ |
|---|---|---|
| 4.4626 | 19.879 | 13.77 |
| 4.3539 | 20.380 | 36.23 |
| 4.2694 | 20.788 | 100.00 |
| 4.0690 | 21.825 | 16.32 |
| 3.9834 | 22.299 | 3.43 |
| 3.7400 | 23.770 | 5.00 |
| 3.6516 | 24.355 | 31.12 |
| 3.3698 | 26.428 | 62.10 |
| 3.0467 | 29.289 | 7.84 |
| 2.9447 | 30.328 | 6.71 |

EXAMPLE 8

A two-phase synthesis reaction mixture was prepared with the organic phase comprised of 60 grams 1-hexanol and 10 grams Si(OC$_2$H$_5$)$_4$, and the aqueous phase comprised of 13.8 grams Al$_2$O$_3$, 23.1 grams H$_3$PO$_4$ (85%), 4.0 grams NaOH, 26.0 g TPABr and 100 g H$_2$O. The reaction mixture as a whole had a composition including 9.3% Si, 38.6% P and 52.1% Al, the percentages atomic. The directing agent was the tetrapropylammonium bromide. The starting pH was between 5 and 7.

The reaction mixture was heated at 50° C. per hour to 150° C. and maintained at that temperature for 168 hours until crystals of silicophosphoaluminate designated herein as MCM-5 were formed.

The crystalline product was separated from the reaction mixture by filtration, water washed and then dried at 80° C. The product crystals were analyzed to contain 9.6% Si, 45.9% P and 44.5% Al, percentages atomic. A sample of the as synthesized MCM-5 silicophosphoaluminate was then submitted for X-ray analysis and found to be a crystalline material exhibiting the diffraction lines shown in Table 7.

TABLE 7

| Interplanar d-Spacing (A) | (MCM-5) Observed 2 × Theta | Relative Intensity. I/I₀ |
|---|---|---|
| 8.5984 | 10.279 | 100.00 |
| 6.7810 | 13.045 | 3.05 |
| 4.7545 | 18.647 | 4.65 |
| 4.6389 | 19.116 | 6.49 |
| 4.5429 | 19.524 | 1.58 |
| 4.4200 | 20.072 | 2.00 |
| 4.3500 | 20.398 | 3.00 |
| 4.2206 | 21.031 | 2.60 |
| 4.1134 | 21.586 | 2.37 |
| 3.8541 | 23.058 | 1.60 |
| 3.7092 | 23.971 | 6.80 |
| 3.6724 | 24.215 | 3.65 |
| 3.4981 | 25.441 | 1.08 |
| 3.3886 | 26.278 | 3.73 |
| 3.3331 | 26.723 | 0.48 |
| 3.2150 | 27.724 | 4.51 |
| 3.1616 | 28.202 | 2.87 |
| 3.0206 | 29.548 | 2.28 |
| 2.9090 | 30.709 | 1.12 |
| 2.8887 | 30.930 | 1.63 |
| 2.7450 | 32.594 | 1.07 |
| 2.7005 | 33.146 | 2.00 |
| 2.6774 | 33.441 | 0.84 |
| 2.6472 | 33.833 | 0.73 |
| 2.5890 | 34.618 | 1.34 |

TABLE 7-continued (MCM-5)

| Interplanar d-Spacing (A) | Observed 2 × Theta | Relative Intensity. I/I$_o$ |
|---|---|---|
| 2.5760 | 34.797 | 1.30 |

EXAMPLE 9

A sample of the calcined product crystalline silicophoaluminate of Example 5 was evaluated for sorption properties to confirm its molecular sieve nature. The results, in wt. %, were as follows:

Water (60° C.): 10.3
n-Hexane (90° C.): 9.3
p-Xylene (90° C.): 2.7
2-Methyl-Pentane (90° C.): 1.1
Cyclohexane (90° C.): 0.8
o-Xylene (120° C.): 0.9.

EXAMPLE 10

A quantity of crystalline silicophosphoaluminate product of Example 3 was evaluated for sorption properties both before and after thermal treatment at 900° C. The sorption properties were proven to be unaltered by such thermal treatment indicating exceptional thermal stability of the crystalline molecular sieve silicophosphoaluminate of Example 3.

EXAMPLE 11

The Example 3 and 4 products were evaluated for acidic properties by the titration of gaseous ammonia released during heating of the ammonium form from 25° to 600° C. Results of this test indicated a maximum rate of ammonia evolution at 360° C. and an ion exchange capacity for each product of 0.7-0.8 meq/gram.

EXAMPLE 12

The Example 3 product was tested in the Alpha Test after conversion to the hydrogen-form by heating the ammonium form to 450°-550° C. in nitrogen. Its Alpha Value proved to be 8.6. This same product proved to have methanol conversion activity at 350° C., toluene alkylation with methanol activity at 538° C. and with ethylene at between 450° C. and 500° C.

EXAMPLES 13-16

Four separate two phase reaction mixtures were prepared for synthesis of four different silicophosphoaluminte crystalline materials designated respectively as MCM-6, MCM-7, MCM-2 and MCM-8. The reaction mixture compositions and reaction conditions are listed in Table 8, hereinafter. The four products obtained each had tetrahedrally coordinated silicon, phosphorus and aluminum in compositions indicated in Table 8.

X-ray diffraction analysis of each silicophosphoaluminate product is listed in the hereinafter presented Tables 9, 10, 11 and 12, for products of Examples 13, 14, 15 and 16, respectively.

The product material of Examples 13, 14 and 15 were evaluated for Constraint Index (defined in U.S. Pat. No. 4,385,195) and Alpha Value. The results are listed in Table 13.

TABLE 8

| Product of Example | 13 | 14 | 15 | 16 |
|---|---|---|---|---|

Synthesis mixture

TABLE 8-continued

| Product of Example | 13 | 14 | 15 | 16 |
|---|---|---|---|---|
| composition (g) | | | | |
| H$_3$PO$_4$ (85%) | 23.1 | 23.1 | 23.1 | 23.1 |
| H$_2$O | 71.0 | 59.6 | 71.0 | 70.0 |
| Al$_2$O$_3$ | 10.0 | 13.7 | 10.0 | 10.0 |
| Si(OC$_2$H$_5$)$_4$ | 10.0 | 10.0 | 10.0 | 10.0 |
| 1-Hexanol | 60.0 | 60.0 | 60.0 | 60.0 |
| Organic base | | | | |
| TMAOH (25%) | — | — | — | 31.0 |
| TEAOH (40%) | 37.0 | — | 37.0 | — |
| di-n-Propylamine | — | 10.1 | — | — |
| Inorganic base (ml; 5 × 10$^{-2}$ M) | | | | |
| KOH | — | — | — | 2.0 |
| CsOH | 0.04 | — | 2.0 | — |
| Conditions | | | | |
| Nucleation time, hours | 24 | 24 | 24 | 24 |
| Nucleation temp., °C. | 130 | 130 | 130 | 130 |
| Crystal. time, hours | 144 | 24 | 144 | 144 |
| Crystal. temp., °C. | 180 | 200 | 180 | 180 |
| Spinning rate, rpm | 800 | 800 | 800 | 800 |
| Starting pH | 6.5 | 5.5 | 6.5 | 5.5 |
| Ending pH | 6.5 | 9 | 6.0 | 7 |
| Product Composition (T-atom reaction) | | | | |
| Si | 19.7 | 12.7 | 19.8 | 15.3 |
| P | 39.9 | 41.7 | 39.6 | 46.3 |
| Al | 40.4 | 45.6 | 40.7 | 38.4 |
| Product Oxide Composition (wt. %, as-synth.) | | | | |
| SiO$_2$ | 15.83 | 10.45 | 14.33 | 11.49 |
| P$_2$O$_5$ | 37.85 | 41.06 | 33.90 | 41.22 |
| Al$_2$O$_3$ | 27.63 | 32.29 | 25.10 | 24.60 |
| N-content (wt. %) | 1.2 | 1.3 | 1.2 | 1.3 |
| C-content (wt. %) | 5.46 | 5.95 | 6.32 | 8.13 |
| Ash content (wt. %) | 85.9 | 87.2 | 85.2 | 87.6 |
| Ion exchange cap. (meq per g ash) | 0.56 | 1.16 | 0.80 | 0.29 |

TABLE 9

(MCM-6)

| Interplanar d-Spacing (A) | Observed 2 × Theta | Relative Intensity. I/I$_o$ |
|---|---|---|
| 11.81457 | 7.476 | 93.1 |
| 6.83915 | 12.934 | 12.5 |
| 5.92518 | 14.939 | 32.4 |
| 4.48008 | 19.801 | 81.1 |
| 4.20412 | 21.115 | 78.7 |
| 3.95564 | 22.458 | 100.0 |
| 3.66765 | 24.847 | 5.0 |
| 3.42339 | 26.006 | 42.3 |
| 3.06571 | 29.104 | 18.8 |
| 2.96477 | 30.118 | 22.1 |
| 2.65646 | 33.712 | 6.8 |
| 2.58880 | 34.620 | 22.3 |

TABLE 10

(MCM-7)

| Interplanar d-Spacing (A) | Observed 2 × Theta | Relative Intensity. I/I$_o$ |
|---|---|---|
| 10.85413 | 8.139 | 18.2 |
| 9.32129 | 9.480 | 29.9 |
| 6.69511 | 13.213 | 11.9 |
| 5.63770 | 15.706 | 25.9 |
| 4.36818 | 20.313 | 85.7 |
| 4.20785 | 21.096 | 100.0 |
| 4.00432 | 22.181 | 60.3 |
| 3.93218 | 22.594 | 64.8 |
| 3.90051 | 22.780 | 71.1 |
| 3.82889 | 23.211 | 76.6 |
| 3.10868 | 28.693 | 8.9 |
| 3.00339 | 29.721 | 10.4 |
| 2.71879 | 32.917 | 11.9 |

TABLE 11

| | (MCM-2) | |
|---|---|---|
| Interplanar d-Spacing (A) | Observed 2 × Theta | Relative Intensity, $I/I_o$ |
| 9.2412 | 9.563 | 99.21 |
| 6.8600 | 12.894 | 24.93 |
| 6.4868 | 13.640 | 7.48 |
| 6.2515 | 14.155 | 14.65 |
| 5.5144 | 16.059 | 72.90 |
| 4.8868 | 18.138 | 21.38 |
| 4.8257 | 18.370 | 11.67 |
| 4.3030 | 20.624 | 100.00 |
| 4.2584 | 20.843 | 23.57 |
| 4.0000 | 22.205 | 5.00 |
| 3.8400 | 23.142 | 5.00 |
| 3.5075 | 25.373 | 21.42 |
| 3.4376 | 25.897 | 22.89 |
| 3.3947 | 26.230 | 7.27 |
| 3.1239 | 28.550 | 1.77 |
| 3.0495 | 29.262 | 14.07 |
| 3.0160 | 29.594 | 5.90 |
| 2.9190 | 30.601 | 33.97 |
| 2.8492 | 31.370 | 25.06 |

TABLE 12

| | (MCM-8) | |
|---|---|---|
| Interplanar d-Spacing (A) | Observed 2 × Theta | Relative Intensity, $I/I_o$ |
| 6.3139 | 14.015 | 68.10 |
| 4.4698 | 19.847 | 48.03 |
| 3.6517 | 24.355 | 100.00 |
| 3.1578 | 28.237 | 15.37 |
| 2.8291 | 31.599 | 12.03 |
| 2.5869 | 34.647 | 13.37 |
| 3.9910 | 22.256 | 5.40 |

TABLE 13

| Product of Example | 13 | 14 | 15 |
|---|---|---|---|
| Constraint Index | 0.5–0.7 | 1.0 | 100 |
| Alpha Value | — | 3.5 | — |

EXAMPLE 17

A two-phase synthesis reaction mixture was prepared with the organic phase comprised of 10 g $Si(OC_2H_5)_4$ and 60 g 1-hexanol, and the aqueous phase comprised of 23.1 g $H_3PO_4$ (85%), 13.7 g $Al_2O_3$, 10.1 g di-n-propylamine and 59.6 g of $H_2O$. The reaction mixture as a whole had a composition including 9.3% Si, 38.8% P and 51.9% Al, the percentages atomic. The directing agent was di-n-propylamine. Starting pH was between 5 and 7.

The reaction mixture was heated at 50° C. per hour to 130° C. and maintained at that temperature for 24 hours. It was then heated to 200° C. and maintained at that temperature for 24 hours until crystals of silicophosphoaluminate designated herein as MCM-9 were formed.

The crystalline product was separated from the reaction mixture by filtration, water washed and then dried at 80° C. The product crystals were analyzed to contain 13.1% Si, 42.7% P and 44.2% Al, percentages atomic. A sample of the as synthesized MCM-9 silicophosphoaluminate was then submitted for X-ray analysis and found to be a molecular sieve structure exhibiting the diffraction lines shown in Table 14.

TABLE 14

| | (MCM-9) | |
|---|---|---|
| Interplanar d-Spacings (A) | Observed 2 × Theta | Relative Intensities $I/I_o$ |
| 16.4111 | 5.381 | 62.39 |
| 10.8526 | 8.140 | 17.66 |
| 9.6576 | 9.149 | 32.12 |
| 9.3204 | 9.481 | 27.26 |
| 8.2047 | 10.774 | 20.52 |
| 6.8566 | 12.901 | 76.05 |
| 6.7054 | 13.193 | 12.08 |
| 6.4892 | 13.634 | 54.07 |
| 6.1653 | 14.354 | 10.73 |
| 5.6353 | 15.712 | 26.80 |
| 5.4550 | 16.235 | 4.23 |
| 4.8496 | 18.278 | 59.79 |
| 4.7388 | 18.710 | 14.59 |
| 4.6681 | 18.996 | 5.63 |
| 4.3551 | 20.375 | 49.35 |
| 4.2273 | 20.998 | 92.67 |
| 4.1353 | 21.471 | 37.27 |
| 4.0810 | 21.759 | 100.00 |
| 4.0106 | 22.146 | 27.79 |
| 3.9298 | 22.607 | 47.48 |
| 3.8322 | 23.191 | 40.95 |
| 3.7598 | 23.644 | 14.34 |
| 3.6060 | 24.668 | 14.55 |
| 3.3878 | 26.285 | 31.22 |
| 3.3439 | 26.636 | 9.32 |
| 3.2759 | 27.199 | 24.92 |
| 3.1640 | 28.180 | 13.98 |
| 3.0649 | 29.112 | 65.46 |
| 2.9449 | 30.325 | 18.46 |
| 2.8926 | 30.887 | 20.58 |
| 2.8367 | 31.512 | 7.14 |
| 2.7792 | 32.181 | 9.79 |
| 2.7311 | 32.764 | 15.65 |
| 2.6815 | 33.388 | 32.91 |
| 2.6183 | 34.218 | 8.19 |

EXAMPLE 18

The synthesis of Example 17 was repeated except that the reaction mixture was kept at 200° C. for 48 hours. The crystalline silicophoaluminate was analyzed to contain 14.5% Si, 42.4% P and 43.1% Al, percentages atomic. A sample of the as synthesized silicophosphoaluminate MCM-9 was submitted for X-ray analysis and found to be a molecular sieve structure exhibiting the diffraction lines shown in Table 15.

TABLE 15

| | (MCM-9) | |
|---|---|---|
| Interplanar d-Spacings (A) | Observed 2 × Theta | Relative Intensitites $I/I_o$ |
| 16.4079 | 5.382 | 100.00 |
| 10.8449 | 8.146 | 7.49 |
| 9.3382 | 9.463 | 14.69 |
| 8.2045 | 10.774 | 30.68 |
| 6.6779 | 13.247 | 7.67 |
| 6.1687 | 14.346 | 14.01 |
| 5.6460 | 15.683 | 12.66 |
| 5.4639 | 16.209 | 5.08 |
| 4.8358 | 18.331 | 3.08 |
| 4.7403 | 18.704 | 14.29 |
| 4.3370 | 20.461 | 14.88 |
| 4.2142 | 21.064 | 54.04 |
| 4.0922 | 21.699 | 28.93 |
| 4.0529 | 21.912 | 33.05 |
| 4.0066 | 22.169 | 16.42 |
| 3.9361 | 22.571 | 42.98 |
| 3.8330 | 23.186 | 25.28 |
| 3.7675 | 23.595 | 20.32 |
| 3.6367 | 24.457 | 7.76 |
| 3.5884 | 24.791 | 8.64 |
| 3.3881 | 26.282 | 5.67 |
| 3.3420 | 26.651 | 3.81 |
| 3.2787 | 27.176 | 32.35 |

TABLE 15-continued (MCM-9)

| Interplanar d-Spacings (A) | Observed 2 × Theta | Relative Intensitites I/I₀ |
|---|---|---|
| 3.1646 | 28.175 | 9.66 |
| 3.0888 | 28.881 | 13.52 |
| 3.0304 | 29.451 | 9.22 |
| 2.9527 | 30.244 | 19.34 |
| 2.8974 | 30.835 | 9.66 |
| 2.8383 | 31.494 | 3.59 |
| 2.7410 | 32.642 | 15.87 |
| 2.6273 | 34.097 | 6.96 |

EXAMPLE 19

A quantity of the crystalline silicophosphoaluminate of Example 18 was calcined at 450° C. in nitrogen for 4 hours and then X-ray analyzed. The results are presented in Table 16.

TABLE 16

| Interplanar d-Spacings (A) | Observed 2 × Theta | Relative Intensities I/I₀ |
|---|---|---|
| 16.3622 | 5.397 | 47.46 |
| 14.0545 | 6.284 | 21.20 |
| 10.9231 | 8.088 | 6.38 |
| 8.9443 | 9.881 | 41.09 |
| 8.1901 | 10.793 | 9.93 |
| 6.9002 | 12.819 | 13.13 |
| 5.4998 | 16.102 | 29.83 |
| 4.4683 | 19.853 | 22.63 |
| 4.3595 | 20.354 | 7.28 |
| 4.0790 | 21.770 | 100.00 |
| 3.9420 | 22.537 | 59.93 |
| 3.7815 | 23.507 | 34.47 |
| 3.5387 | 25.145 | 18.20 |
| 3.4518 | 25.788 | 10.08 |
| 3.3277 | 26.768 | 7.78 |
| 3.2785 | 27.177 | 13.51 |
| 3.2215 | 27.668 | 7.00 |
| 3.0139 | 29.615 | 33.24 |
| 2.9487 | 30.286 | 11.29 |
| 2.8231 | 31.668 | 7.73 |
| 2.7398 | 32.657 | 18.39 |

EXAMPLE 20

A two-phase synthesis reaction mixture was prepared with the organic phase comprised of 60 g n-hexanol and 10 g Si(OC$_2$H$_5$)$_4$, and the aqueous phase comprised of 23.1 g H$_3$PO$_4$ (85%), 10 g Al$_2$O$_3$, 154.4 g of 3.6N, Diquat-7 (OH)$_2$ (i.e. (OH)(CH$_3$)$_3$N(CH$_2$)$_7$N(CH$_3$)$_3$(OH)). The reaction mixture as a whole had a composition incuding 10.8% Si, 45% P and 44.2% Al, the percentages atomic. The directing agent was Diquat-7 (OH)$_2$. The initial pH was slightly higher than 6.

The reaction mixture was heated at 50° C. per hour to 130° C. and maintained at that temperature for 24 hours. It was then heated to 180° C. and maintained there for 144 hours. During this time, mixing was obtained by spinning at 800 rpm.

The crystalline product was separated from the reaction mixture by filtration, water washed and then dried at 80° C. The product crystalline silicophosphoaluminate had a composition including 19.9% Si, 37.1% P, and 43.0% Al, the percentages atomic. A sample of the as synthesized silicophosphoaluminate designated herein as MCM-10 was then submitted for X-ray analysis. It was found to be a crystlline molecular sieve exhibiting the diffraction lines shown in Table 17.

TABLE 17

(MCM-10)

| Interplanar d-Spacing (A) | Observed 2 × Theta | Relative Intensity, I/I₀ |
|---|---|---|
| 11.8446 | 7.457 | 17.04 |
| 10.1960 | 8.665 | 78.40 |
| 7.6489 | 11.559 | 84.85 |
| 6.8567 | 12.900 | 24.39 |
| 5.9273 | 14.934 | 13.31 |
| 5.6856 | 15.573 | 35.97 |
| 5.1059 | 17.354 | 57.48 |
| 5.0091 | 17.692 | 64.21 |
| 4.4885 | 19.763 | 10.91 |
| 4.3742 | 20.285 | 85.60 |
| 4.0918 | 21.701 | 100.00 |
| 3.9534 | 22.471 | 11.66 |
| 3.7982 | 23.402 | 42.70 |
| 3.7262 | 23.861 | 13.62 |
| 3.4249 | 25.995 | 26.69 |
| 3.2165 | 27.711 | 81.46 |
| 3.1626 | 28.193 | 8.65 |
| 2.9904 | 29.854 | 20.84 |
| 2.9657 | 30.108 | 21.06 |
| 2.9347 | 30.433 | 32.19 |
| 2.8448 | 31.420 | 36.84 |
| 2.7846 | 32.118 | 7.41 |
| 2.6813 | 33.390 | 42.38 |
| 2.5893 | 34.614 | 19.50 |

EXAMPLE 21

The synthesis of Example 20 was repeated except that only 30 g of water was added. The resulting crystalline product silicophosphoaluminate MCM-10 had an X-ray diffraction pattern showing lines similar to those reported in Table 17. The product was 50% crystalline.

EXAMPLE 22

A quantity of the crystalline MCM-10 silicophosphoaluminate of Example 20 was calcined at 450° C. in nitrogen for 4 hours and then X-ray analyzed. The results are presented in Table 18.

TABLE 18

| Interplanar d-Spacing (A) | Observed 2 × Theta | Relative Intensity, I/I₀ |
|---|---|---|
| 11.7521 | 7.516 | 20.81 |
| 10.1070 | 8.742 | 85.44 |
| 7.5640 | 11.690 | 100.00 |
| 6.8057 | 12.997 | 71.80 |
| 5.6522 | 15.665 | 25.38 |
| 5.0770 | 17.453 | 29.02 |
| 4.9416 | 17.935 | 78.18 |
| 4.4564 | 19.907 | 16.58 |
| 4.3515 | 20.392 | 99.63 |
| 4.2756 | 20.758 | 25.68 |
| 4.0759 | 21.787 | 83.25 |
| 3.8546 | 23.055 | 15.88 |
| 3.7499 | 23.707 | 21.15 |
| 3.4089 | 26.119 | 42.38 |
| 3.1778 | 28.056 | 68.19 |
| 2.9616 | 30.151 | 29.91 |
| 2.9230 | 30.558 | 51.09 |
| 2.8835 | 30.988 | 10.99 |
| 2.8321 | 31.564 | 36.78 |
| 2.6565 | 33.711 | 43.09 |
| 2.5795 | 34.749 | 19.66 |

What is claimed is:

1. A method for synthesizing crystalline silicophosphoaluminate, which method comprises:
    (1) providing a reaction mixture comprising water, sources of aluminum oxide, silicon oxide, and phosphorus oxide, one of the said oxide sources being unstable in the water, an organic directing agent A, inorganic cations M and anions N, and a substantially water-immiscible organic solvent for the said oxide source unstable in the water, the components of said reaction mixture having the following relationship:

$$(A)_a:(M_2O)_b:(Al_2O_3)_c:(SiO_2)_d:(P_2O_5)_e:(Solvent)_f:(N)_g:(H_2O)_h$$

wherein a, b, c, d, e, f, g and h are numbers satisfying the following relationships:
$a/(c+d+e)$ is less than 4,
$b/(c+d+e)$ is less than 2
$d/(c+e)$ is less than 2,
$f/(c+d+e)$ is from 0.1 to 15,
$g/(c+d+e)$ is less than 2, and
$h/(c+d+e)$ is from 3 to 150,
wherein upon initial provision of said reaction mixture the said oxide source unstable in the water is dispersed or dissolved in the water-immiscible organic solvent;

(2) heating said reaction mixture at a rate of from 5° C. to 200° C. per hour to a temperature of from 80° C. to 300° C.;

(3) agitating said reaction mixture in a manner sufficient to intimately admix the water-immiscible organic solvent and the water with each other, thereby progressively hydrolyzing the oxide source unstable in water;

(4) maintaining said agitated reaction mixture at a temperature of from 80° C. to 300° C. and a pH of from 2 to 9 until crystals of silicophoaluminate material are formed; and (5) recovering from said reaction mixture silicophoaluminate material characterized by a composition, in the anhydrous state, as follows:

$$A'_v:M_{x/m}{}^{m+}:(AlO_2)_{1-y}{}^-:(PO_2)_{1-x}{}^+:(SiO_2)_{x+y}:N_{v-n}{}^{n-}$$

wherein A' represents the total of organic directing agent A plus organic solvent, v is the number of moles of A', m is the valence of cation M, n is the valence of anion N, and x and y are numbers of from greater than $-1$ to less than $+1$ which satisfy the relationships:
(1) if x is 0, the y is not 0,
(2) if y is 0, then x is not 0,
(3) if the atomic ratio of Al/P is greater than 1, then $(x+y)$ is greater than 0 and $y+0.6x$ is less than 0.4, and
(4) if the atomic ratio of Al/P is less than 1, then $(x+y)$ is greater than 0 and 0.5 is greater than $0.5 y+x$,
said silicophoaluminate having an ion exchange capacity of at least about 0.002 meq/g.

2. A method according to claim 1 wherein the organic directing agent A is an amine or an onium compound of the formula $$R_4M^+X^- \text{ or } (R_3M^+R'M^+R_3)X_2^-$$

wherein R or R' are alkyl or alkylene of from 1 to 20 carbon atoms, heteroalkyl from 1 to 20 carbon atoms, aryl, heteroaryl, cycloalkyl of from 3 to 6 carbon atoms, cycloheteroalkyl of from 3 to 6 carbon atoms, or combinations thereof; M is a tetracoordinate element atom selected from nitrogen, phosphorus, arsenic, antimony or bismuth or a heteroatom selected from N, O, S, Se, P or As in an alicyclic, heteroalicyclic or heteroaromatic structure; and X is an anion.

3. A method according to claim 2 wherein the organic directing agent A is selected from $C_1$-$C_3$ alkylamines and onium compounds of the formula $$R_4M^+X^- \text{ or } (R_3M^+R'M^+R_3)X_2^-$$

wherein R is $C_1$ to $C_4$ alkyl, R' is $C_1$ to $C_6$ alkylene, M is nitrogen and X is halide or hydroxide; and wherein the water-immiscible organic solvent is a $C_5$ to $C_{10}$ alcohol.

4. A method according to claim 1 wherein the source of silicon oxide is initially present in the water-immiscible organic solvent and wherein the pH of the agitated reaction mixture is maintained between 6 and 9.

5. A method according to claim 1 which comprises the additional step of heating the recovered silicophoaluminate at a temperature of from 300° C. to 1000° C.

6. A method according to claim 1 wherein the silicophoaluminate material recovered from the reaction mixture has, prior to heating, an X-ray diffraction pattern substantially similar to that set forth in Table 1 of the specification.

7. A method according to claim 1 wherein the silicophoaluminate material recovered from the reaction mixture has, prior to heating, an X-ray diffraction pattern substantially similar to that set forth in Table 3 of the specification.

8. A method according to claim 1 wherein the silicophoaluminate material recovered from the reaction mixture has, prior to heating, an X-ray diffraction pattern substantially similar to that set forth in Table 5 of the specification.

9. A method according to claim 1 wherein the silicophoaluminate material recovered from the reaction mixture has, prior to heating, an X-ray diffraction pattern substantially similar to that set forth in Table 6 of the specification.

10. A method according to claim 1 wherein the silicophoaluminate material recovered from the reaction mixture is designated MCM-5 and has, prior to heating, an X-ray diffraction pattern substantially similar to that set forth in Table 7 of the specification.

11. A method according to claim 1 wherein the silicophoaluminate material recovered from the reaction mixture has, prior to heating, an X-ray diffraction pattern substantially similar to that set forth in Table 9 of the specification.

12. A method according to claim 1 wherein the silicophoaluminate material recovered from the reaction mixture has, prior to heating, an X-ray diffraction pattern substantially similar to that set forth in Table 10 of the specification.

13. A method according to claim 1 wherein the silicophoaluminate material recovered from the reaction mixture has, prior to heating, an X-ray diffraction pattern substantially similar to that set forth in Table 12 of the specification.

14. A method according to claim 1 wherein the silicophoaluminate material recovered from the reaction mixture has, prior to heating, an X-ray diffraction pattern substantially similar to that set forth in Table 15 of the specification.

15. A method according to claim 1 wherein the silicophoaluminate material recovered from the reaction mixture has, prior to heating, an X-ray diffraction pattern substantially similar to that set forth in Table 17 of the specification.

* * * * *

UNITED STATES PATENT AND TRADEMARK OFFICE
CERTIFICATE OF CORRECTION

PATENT NO. : 4,673,559

DATED : June 16, 1987

INVENTOR(S) : Eric G. Derouane et al

It is certified that error appears in the above-identified patent and that said Letters Patent is hereby corrected as shown below:

```
Column 1, line 26 "coxponents" should be --components--
Column 1, line 51 "approximate 1-" should be --approximately 1-4--
Column 7, line 52 "Ihus" should be --Thus--
Column 12, line 4 "1-hexano" should be --1-hexanol--
Column 12, line 7 "TPACH" should be --TPAOH--
```

Signed and Sealed this

Twenty-sixth Day of January, 1988

Attest:

DONALD J. QUIGG

*Attesting Officer*  *Commissioner of Patents and Trademarks*